US009328209B2

(12) United States Patent
Mather et al.

(10) Patent No.: US 9,328,209 B2
(45) Date of Patent: *May 3, 2016

(54) SHAPE MEMORY ELASTOMERIC COMPOSITES AND METHOD OF MANUFACTURING

(75) Inventors: Patrick T. Mather, Manlius, NY (US); Luo Xiaofan, Syracuse, NY (US)

(73) Assignee: SYRACUSE UNIVERSITY, Syracuse, NY (US)

(*) Notice: Subject to any disclaimer, the term of this patent is extended or adjusted under 35 U.S.C. 154(b) by 735 days.

This patent is subject to a terminal disclaimer.

(21) Appl. No.: 12/842,602

(22) Filed: Jul. 23, 2010

(65) Prior Publication Data
US 2011/0021097 A1 Jan. 27, 2011

Related U.S. Application Data

(60) Provisional application No. 61/228,305, filed on Jul. 24, 2009.

(51) Int. Cl.
*C08J 5/24* (2006.01)
*D04H 13/00* (2006.01)
*D04H 1/64* (2012.01)
*C08J 5/04* (2006.01)

(52) U.S. Cl.
CPC .. *C08J 5/24* (2013.01); *C08J 5/046* (2013.01); *D04H 1/641* (2013.01); *D04H 13/00* (2013.01); *C08G 2280/00* (2013.01); *C08J 2383/04* (2013.01); *Y10T 442/2008* (2015.04); *Y10T 442/2369* (2015.04)

(58) Field of Classification Search
None
See application file for complete search history.

(56) References Cited

U.S. PATENT DOCUMENTS

| 5,983,394 A | * | 11/1999 | Joo | 2/113 |
| 6,562,180 B1 | * | 5/2003 | Bohin et al. | 156/329 |
| 8,652,976 B2 | * | 2/2014 | Kalbe et al. | 442/329 |
| 2002/0164446 A1 | * | 11/2002 | Zhou et al. | 428/40.1 |

(Continued)

FOREIGN PATENT DOCUMENTS

JP 61252353 A * 11/1986
JP 02307975 A * 12/1990

(Continued)

OTHER PUBLICATIONS

Sill et al., "Electrospinning: Applications in Drug Delivery and Tissue Engineering", Biomaterials 29 (2008) pp. 1989-2006.*

(Continued)

*Primary Examiner* — Scott R Walshon
(74) *Attorney, Agent, or Firm* — Bond Schoeneck & King, PLLC; David Nocilly; George McGuire

(57) ABSTRACT

A shape memory composite consisting of an electrospun non-woven fiber mat and an elastomeric resin matrix. The fiber mat is made from a semi-crystalline polymer, poly(ε-caprolactone) (PCL) and serves as the "switching phase" for shape fixing and recovery. The resin matrix, a crosslinked PDMS elastomer, imparts softness as well as entropic elasticity to the material. PCL is first electrospun from a chloroform/DMF solution. The resulting microfiber mat was then immersed in a two-part (base resin and crosslinking agent) mixture of Sylgard 184 with a vacuum applied to infiltrate the fiber mat with the mixture. The infiltrated fiber mat is then removed from the mixture and cured at room temperature for two days.

8 Claims, 18 Drawing Sheets

(56) References Cited

U.S. PATENT DOCUMENTS

| | | | | |
|---|---|---|---|---|
| 2003/0086962 | A1* | 5/2003 | Westerfield et al. | 424/443 |
| 2004/0265355 | A1* | 12/2004 | Shalaby | 424/426 |
| 2005/0075255 | A1* | 4/2005 | McAtee et al. | 510/122 |
| 2006/0153904 | A1* | 7/2006 | Smith et al. | 424/448 |
| 2006/0263417 | A1* | 11/2006 | Lelkes et al. | 424/443 |
| 2007/0050018 | A1* | 3/2007 | Wainwright | 623/1.51 |
| 2009/0166291 | A1* | 7/2009 | Jackson | 210/641 |
| 2011/0270412 | A1* | 11/2011 | Bellan et al. | 623/23.72 |

FOREIGN PATENT DOCUMENTS

WO    WO 2006128521 A1 * 12/2006
WO    WO 2010009320 A1 * 1/2010

OTHER PUBLICATIONS

Kenawy et al., "Release of tetracycline hydrochloride from electrospun poly(ethylene-co-vinylacetate), poly(lactic acid), and a blend", Journal of Controlled Release 81 (2002), pp. 57-64.*

Vasita et al., "Nanofibers and their Applications in Tissue Engineering", International Journal of Nanomedicine vol. 1 pp. 15-30 (2006).*

* cited by examiner

SHAPE MEMORY ELASTOMERIC COMPOSITES AND METHOD OF MANUFACTURING

CROSS-REFERENCE TO RELATED APPLICATIONS

This application claims the benefit of U.S. Provisional Application No. 61/228,305, filed on Jul. 24, 2009, hereby incorporated by reference in its entirety.

BACKGROUND OF THE INVENTION

1. Field of the Invention

The present invention relates to shape memory polymers and, more specifically, to an elastomeric shape memory polymer material.

2. Description of the Related Art

Shape memory polymers (SMPs) are a class of smart polymeric materials that have the ability to "memorize" a permanent shape, be manipulated to retain, or "fix" a temporary shape, and later recover to its original (permanent) shape upon a stimulus such as heat, electricity, or irradiation. They are great candidates for a variety of applications including actuators, deployable medical devices, smart adhesives, toys, sensors, among others. Although a large number of SMPs have been developed so far, there are very few of them that are "soft", or elastomeric, although the demand for soft actuators is high, especially in the medical field. Two existing material systems that fall into this category are main-chain liquid crystalline elastomers and shape memory hydrogels. However, they either show relatively high synthesis and manufacturing cost, or require the material to be in a hydrated state, both limiting their use in broader industrial applications.

BRIEF SUMMARY OF THE INVENTION

It is therefore a principal object and advantage of the present invention to provide a low-cost soft and elastomeric shape memory polymer material as well as a simple method of fabrication.

In accordance with the foregoing objects and advantages, the present invention provides a composite consisting of an electrospun non-woven fiber mat and an elastomeric resin matrix. Unlike conventional approaches to shape memory, the composite approach contributes the two major functionalities of shape memory—fixing and recovery—from these two components. In the present implementation, the fiber mat is made from a semi-crystalline polymer, poly(ε-caprolactone) (PCL) or a glassy polymer, poly(vinyl acetate), which serves as the "switching phase" for shape fixing and recovery. The resin matrix, a crosslinked poly(dimethyl siloxane) (PDMS) elastomer (Sylgard® 184, available from Dow Corning of Midland, Mich.), imparts softness as well as entropic elasticity to the material. The material can be fabricated by a simple two-step process and used for a variety of applications where a soft shape memory polymer would be beneficial.

BRIEF DESCRIPTION OF THE SEVERAL VIEWS OF THE DRAWING(S)

The present invention will be more fully understood and appreciated by reading the following Detailed Description in conjunction with the accompanying drawings, in which.

Figure 6:
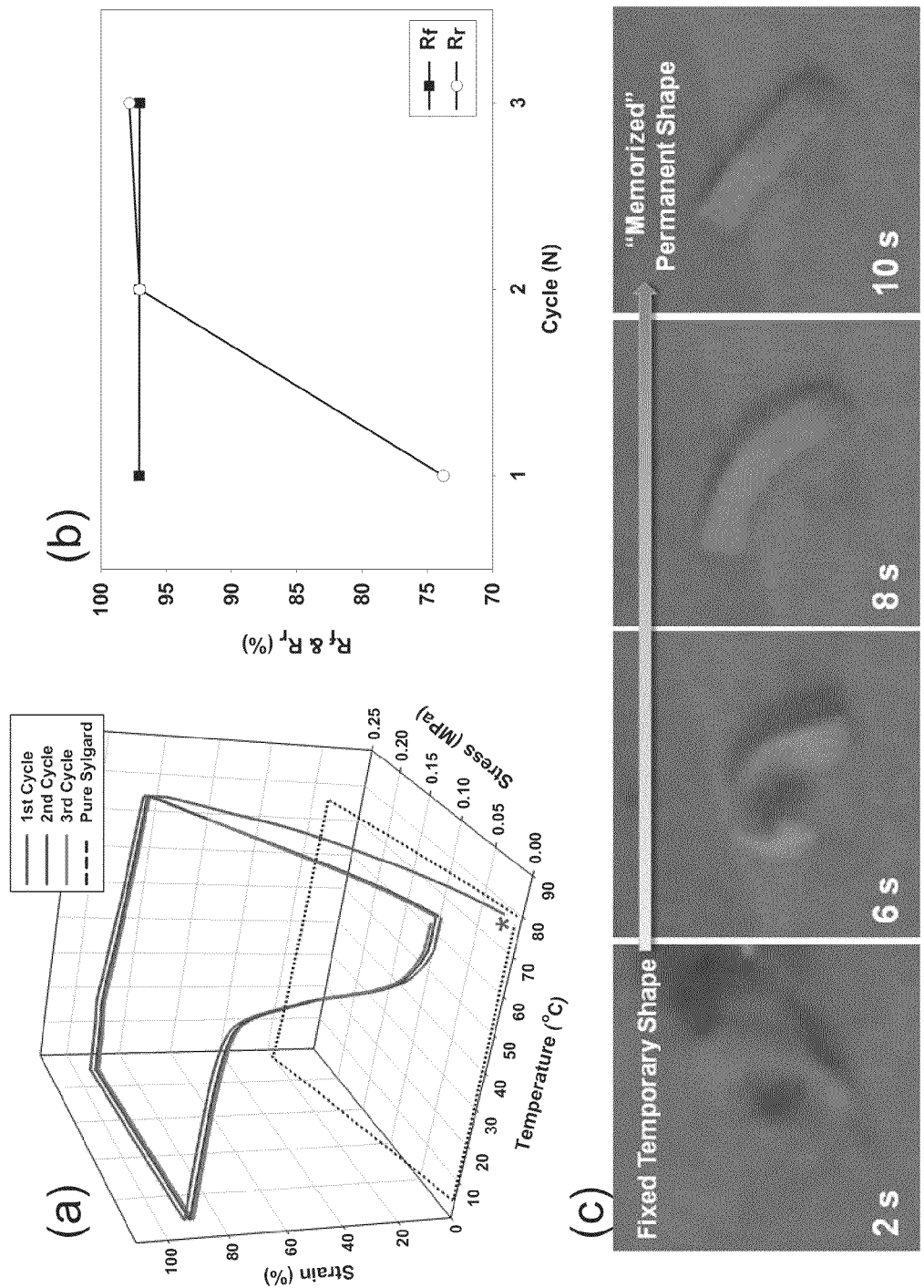

FIG. 6 illustrated the shape memory properties of the present invention via: (a) a graph of the one-way stress-temperature-strain shape memory cycles (N=3) of Sylgard/PCL composite, (b) a graph of the shape fixity ($R_f$) and recovery ratio ($R_r$) as functions of cycle number N, and (c) photographic images of Sylgard/PCL composite showing the recovery from a fixed, temporary shape to its permanent, straight shape on a temperature-controlled plate isothermal at 80° C.

Figure 7:
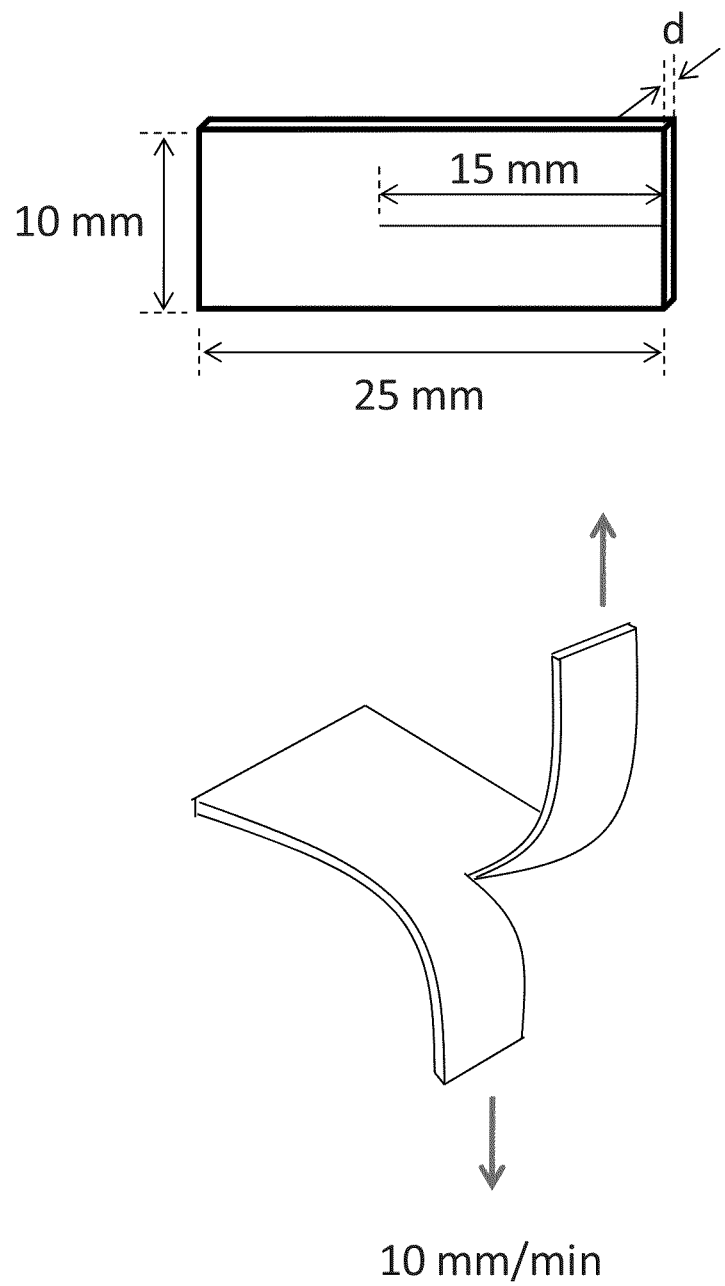

FIG. 7 is a schematic of the geometry used for trouser tear test (top) and a schematic illustration of the experiment (bottom) where the pre-crack (15 mm) was created by pressing down a fresh, sharp razor blade.

Figure 8:
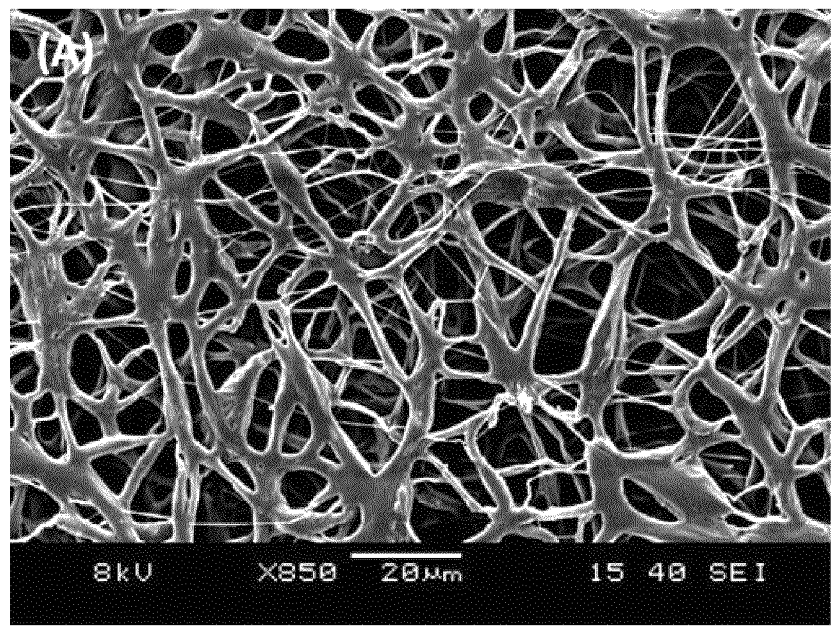
Figure 8:
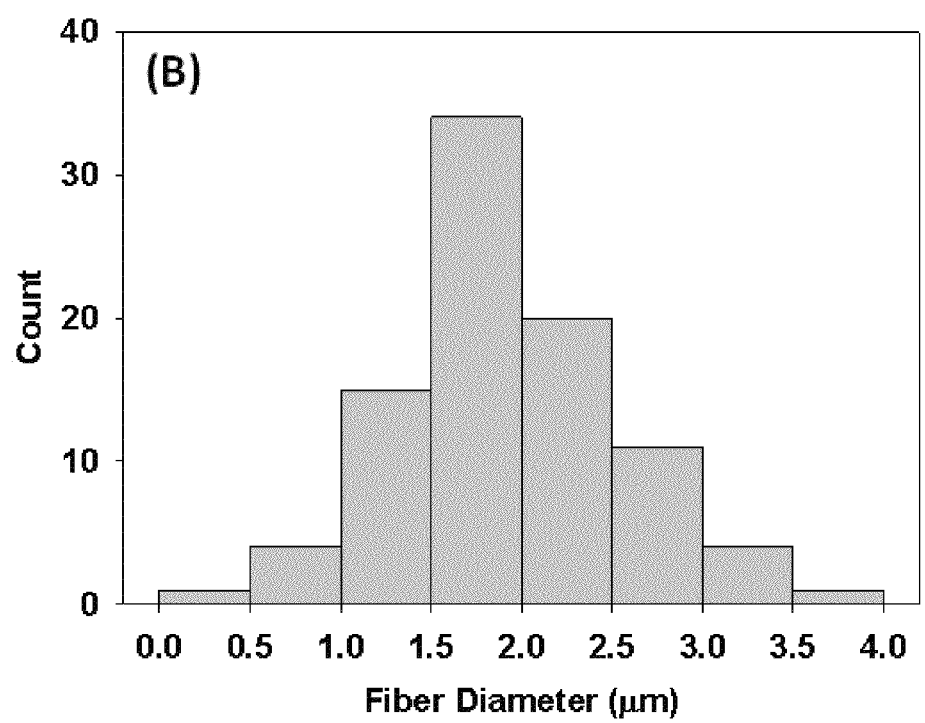

FIG. 8 is an SEM and graph of the fiber diameter analysis, where a total number of 90 fibers were randomly picked from the SEM image (A) and their diameters measured using the ImageJ software. The histogram was then plotted (B) to visualize the distribution. The number-average fiber diameter was calculated to be 1.93 µm with a standard deviation of 0.60 µm.

Figure 9:
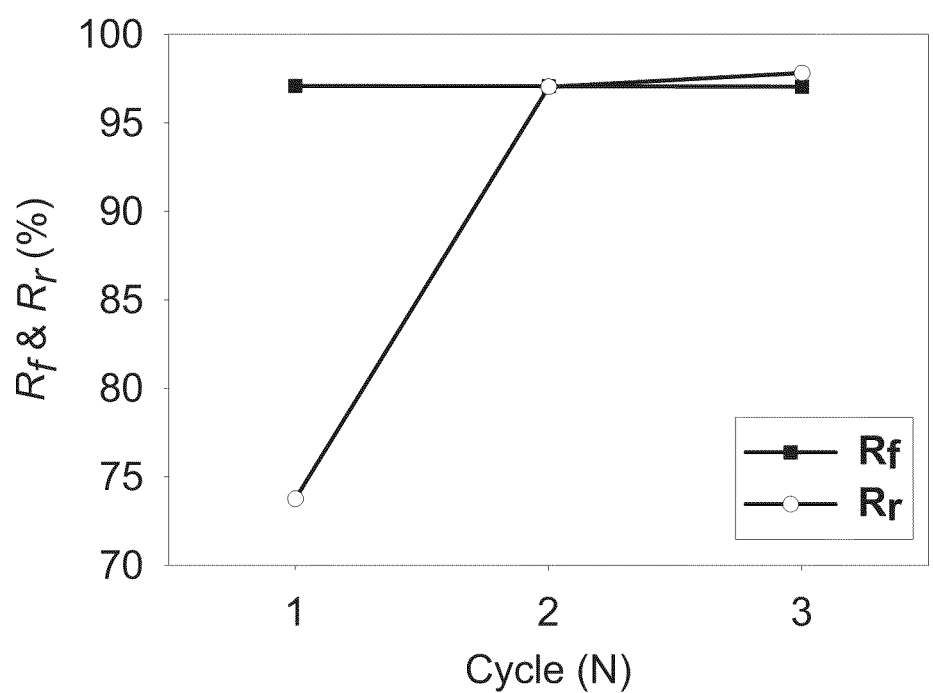

FIG. 9 is a graph of the fixing ratios ($R_f$) and recovery ratios ($R_r$) calculated from the one-way shape memory cycles of Sylgard/PCL composite.

FIGS. 10(A) and (B) are graphs of the 1WSM cycles of the Sylgard/PCL composite following a thermal conditioning program, where (A) is a plot of the strain vs. temperature plot of the thermal conditioning step, and (B) is a plot of the 1WSM cycles, where three consecutive cycles were performed.

Figure 11:
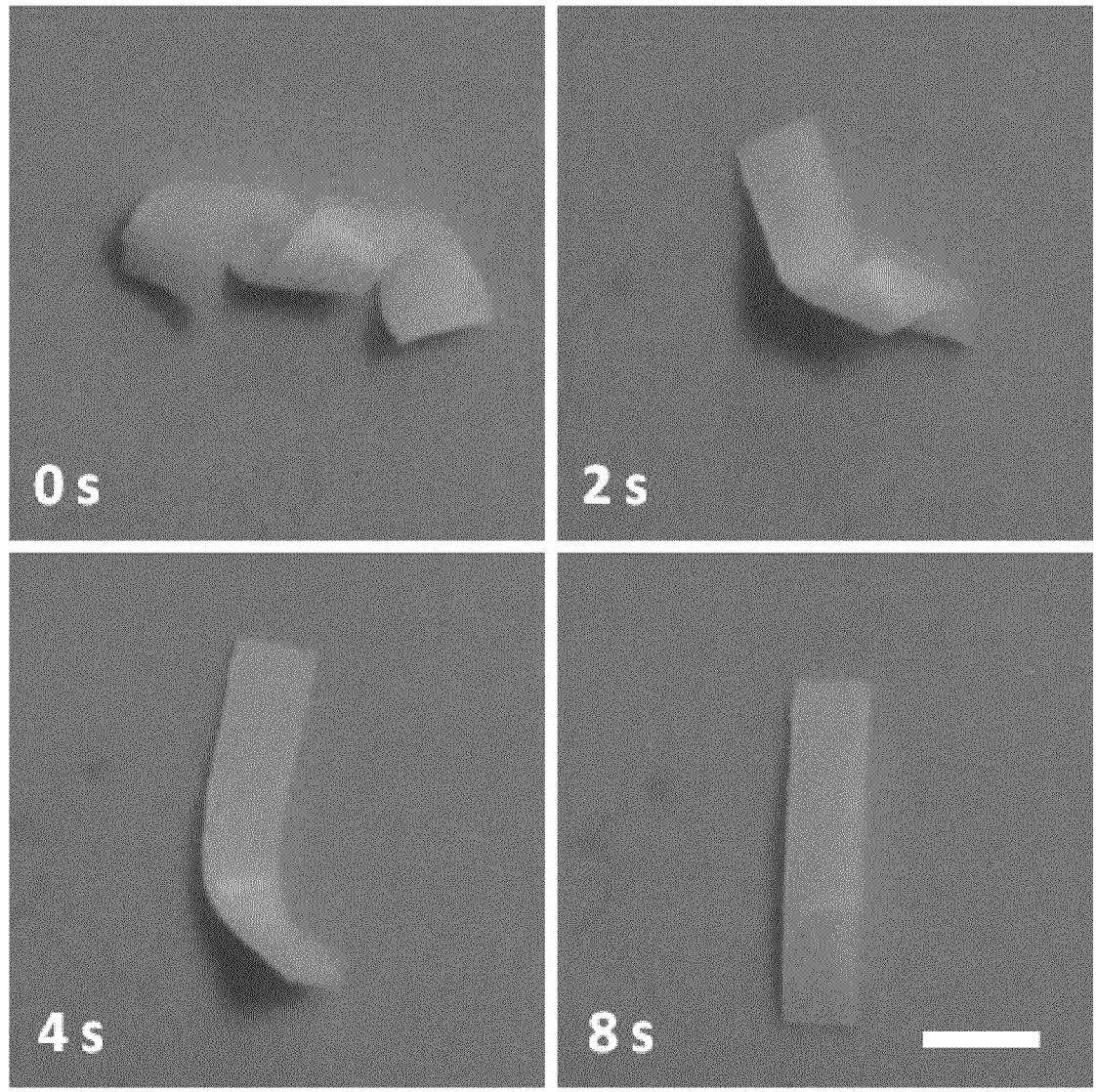

FIG. 11 is a series of time lapse photographs of a Sylgard/PCL composite during the recovery from a fixed temporary shape to its "memorized" permanent shape on a temperature-controlled plate at 80° C. (the scale bar represents 5 mm).

Figure 12:
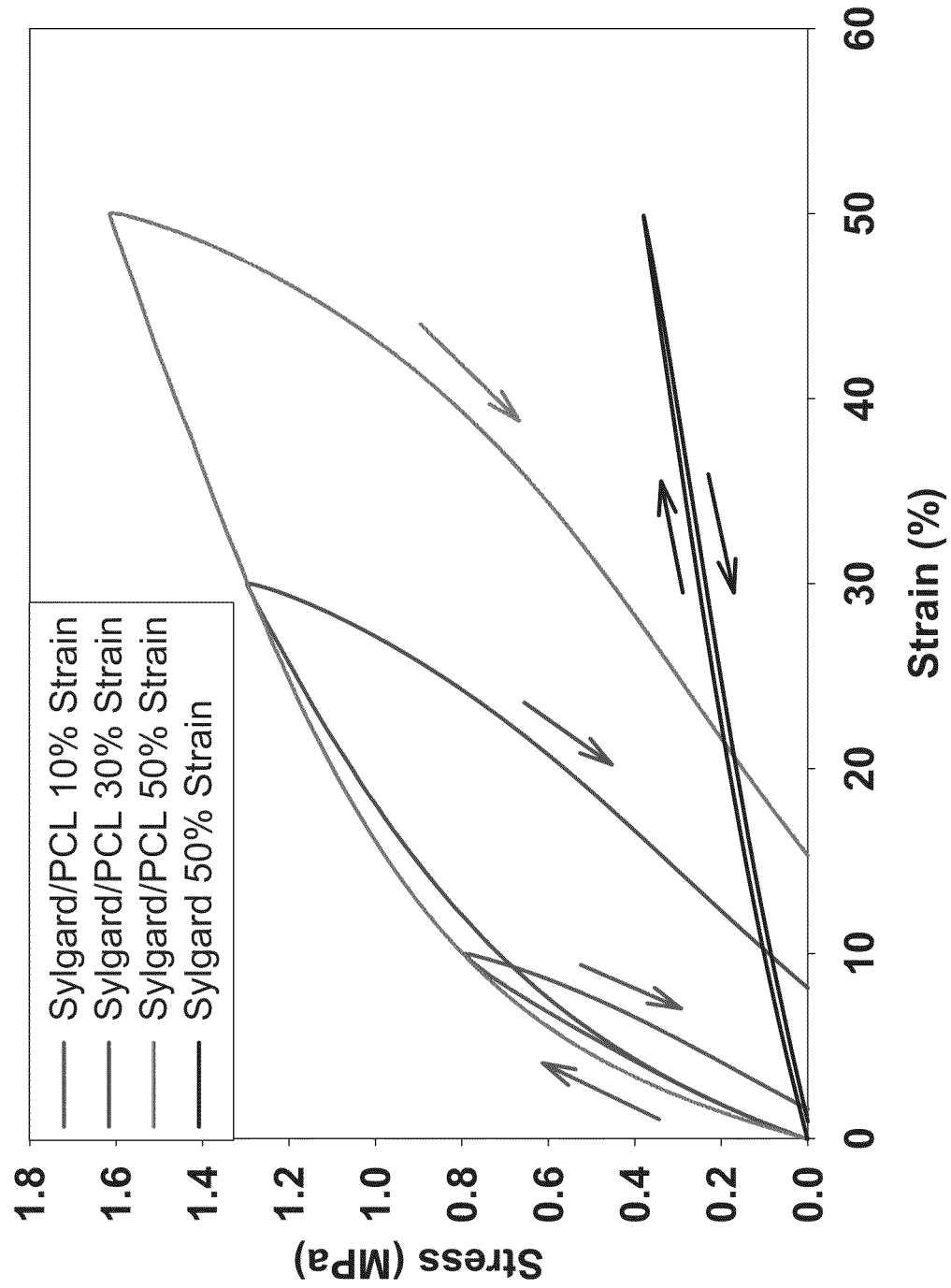

FIG. 12 is a graph of the tensile stress-strain results of Sylgard/PCL composite to different final strains, in comparison with neat Sylgard, where all the experiments were conducted at room temperature (25° C.) with the arrows indicating loading/unloading.

Figure 13:
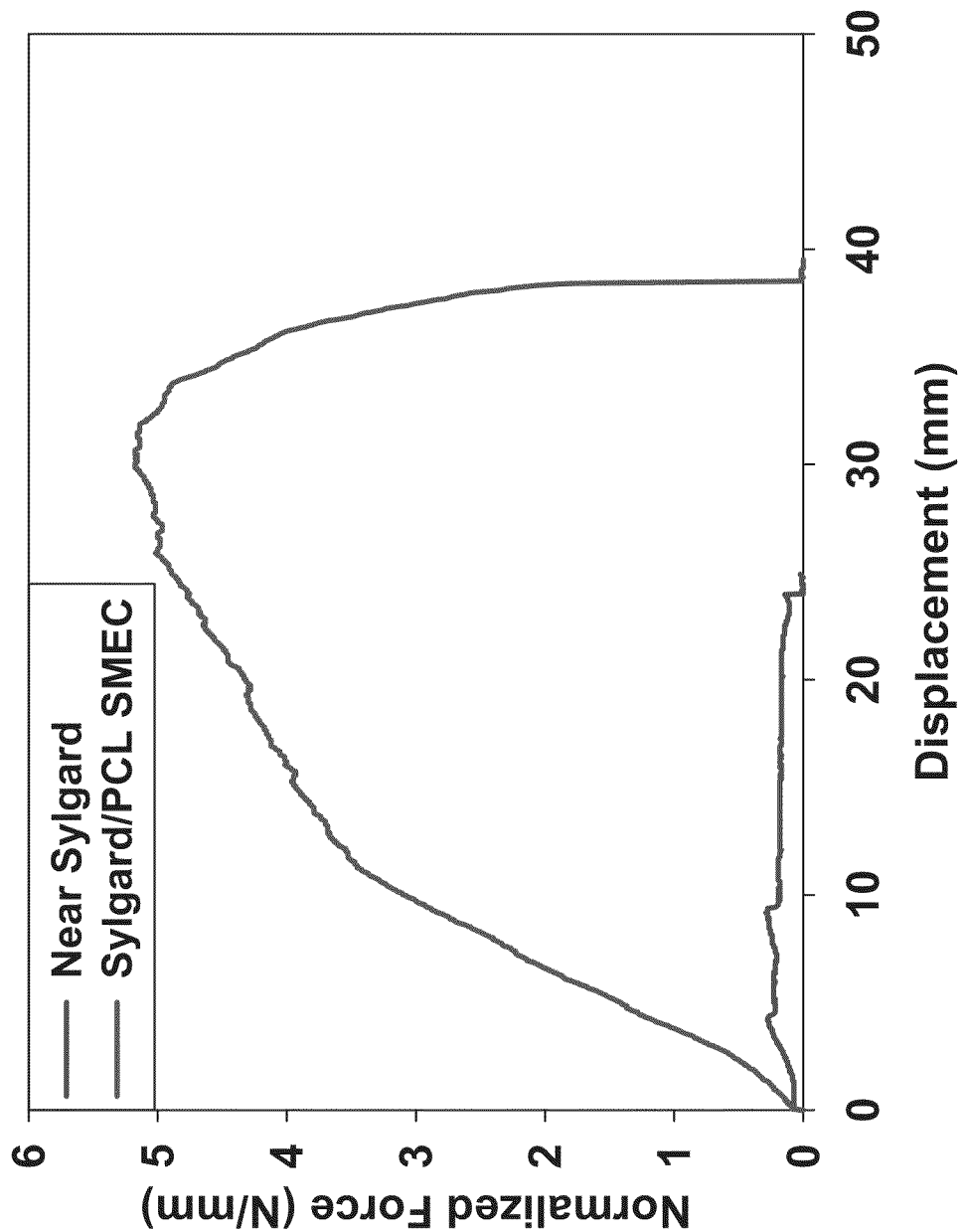

FIG. 13 is a graph of the representative normalized-force vs. displacement curves from the trouser-tear tests of neat Sylgard and Sylgard/PCL composite.

Figure 14:
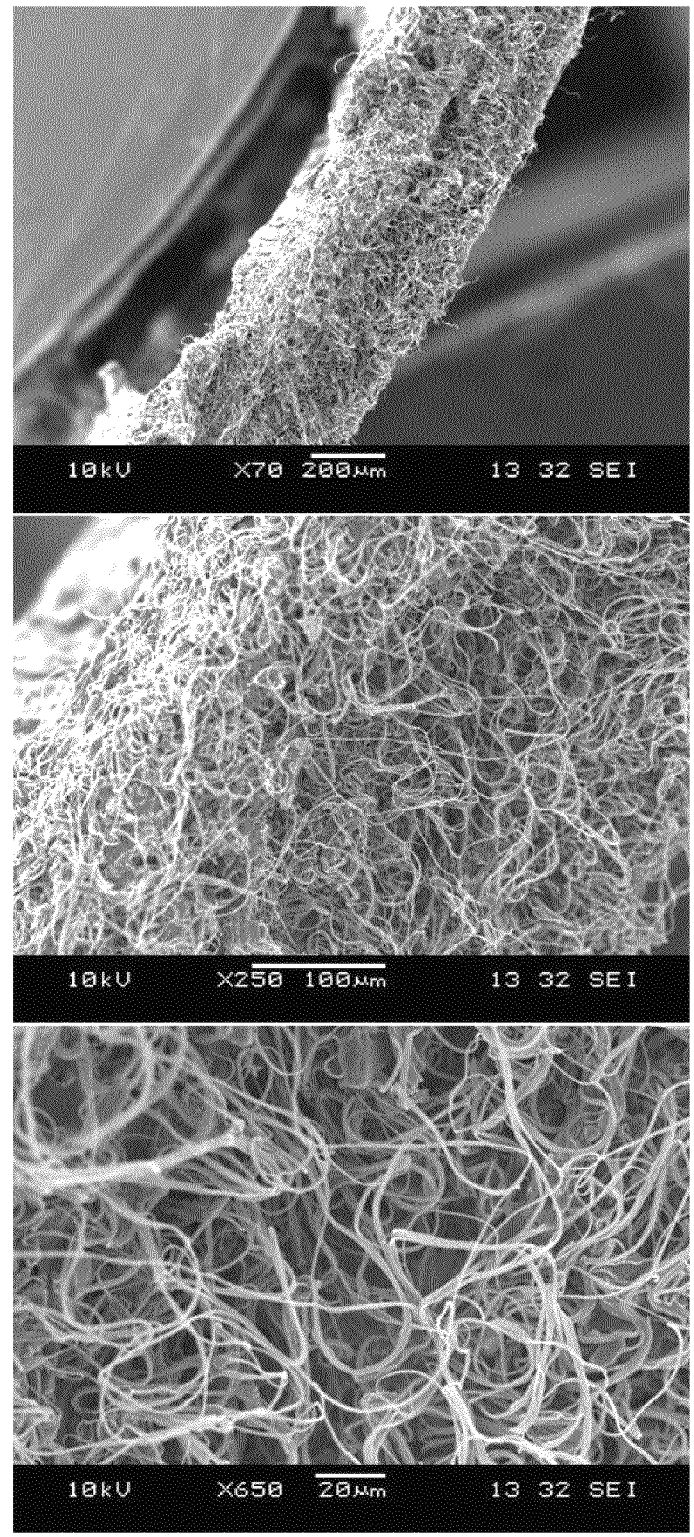

FIG. 14 is a series of SEM images of the fractured surface of Sylgard/PCL after trouser-tear test.

Figure 15:
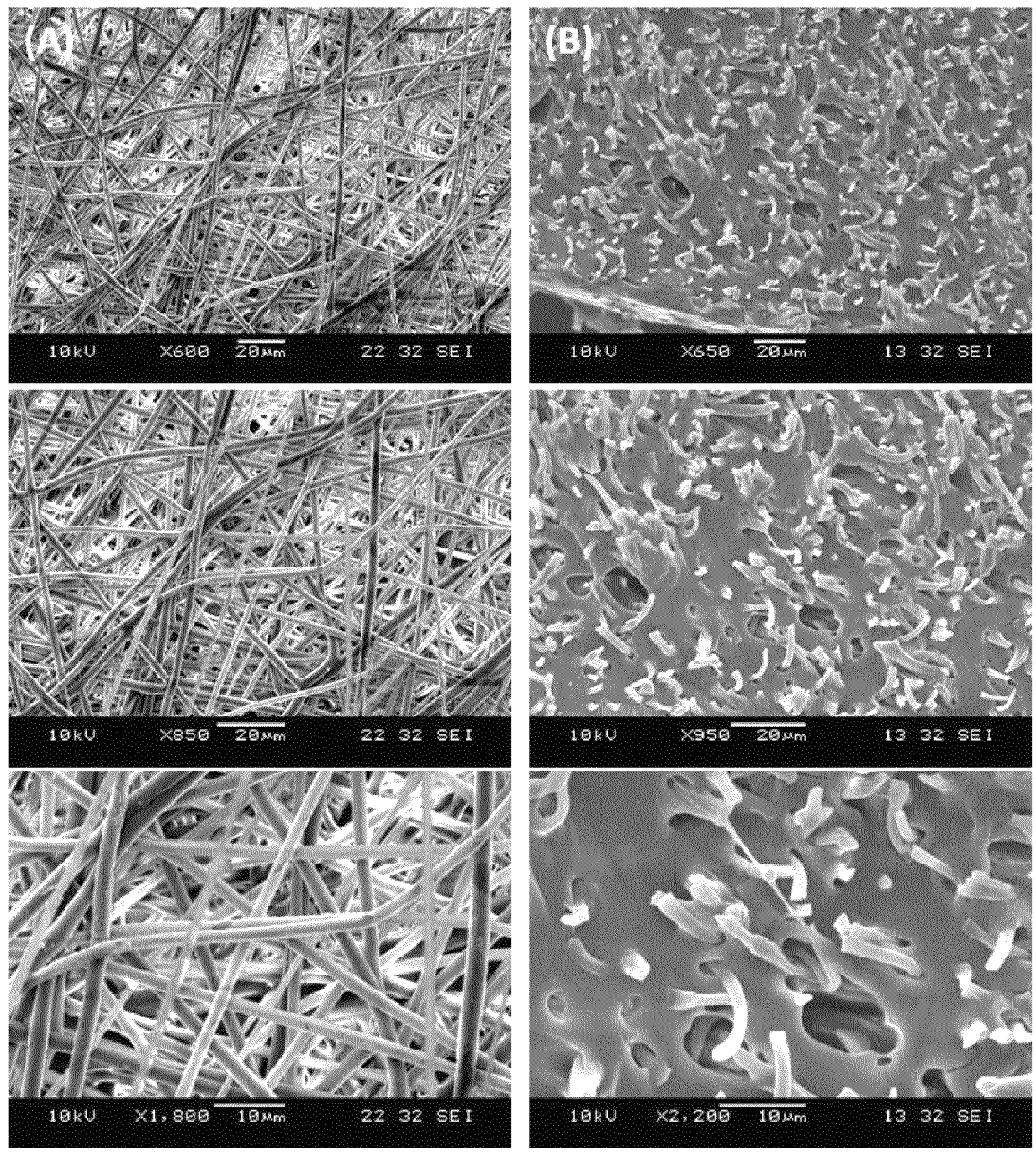

FIG. 15 is a series of SEM images showing (A, left column) as-spun PVAc and (B, right column) the fractured surface of a Sylgard/PVAc composite, where the magnification is increased from top to bottom.

Figure 16:
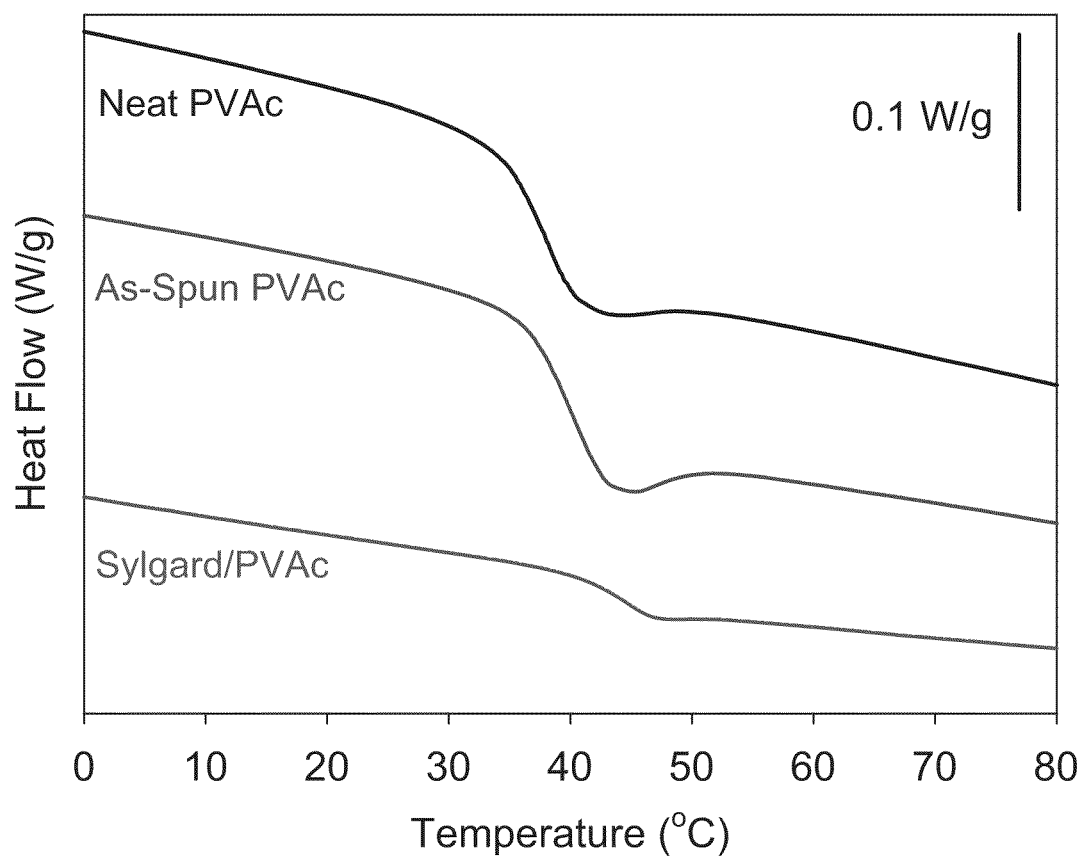

FIG. 16 is a graph of the second heating DSC thermograms for neat PVAc, as-spun PVAc, and the Sylgard/PVAc composite.

Figure 17:
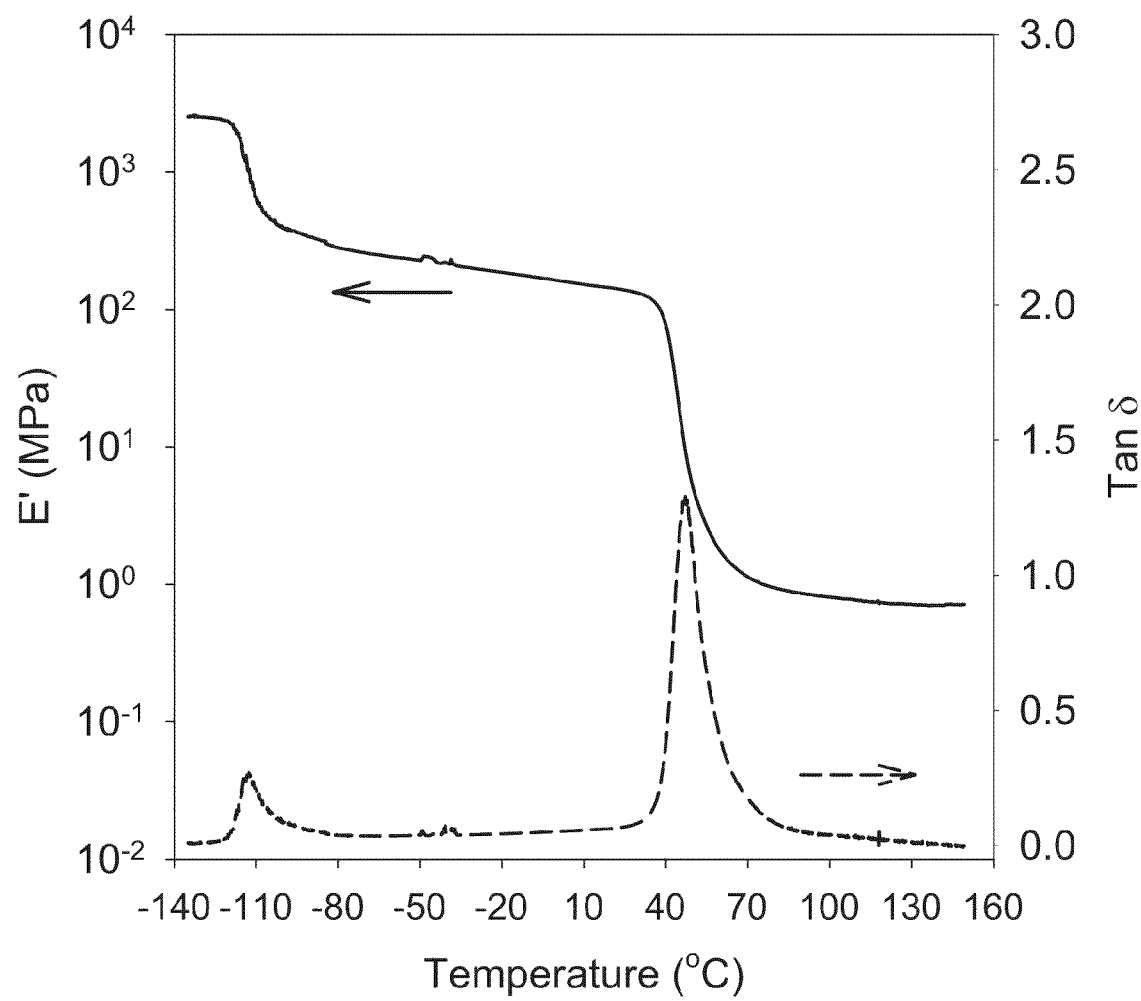

FIG. 17 is a graph of the dynamic mechanical analysis (DMA) results of the Sylgard/PVAc composite.

Figure 18:
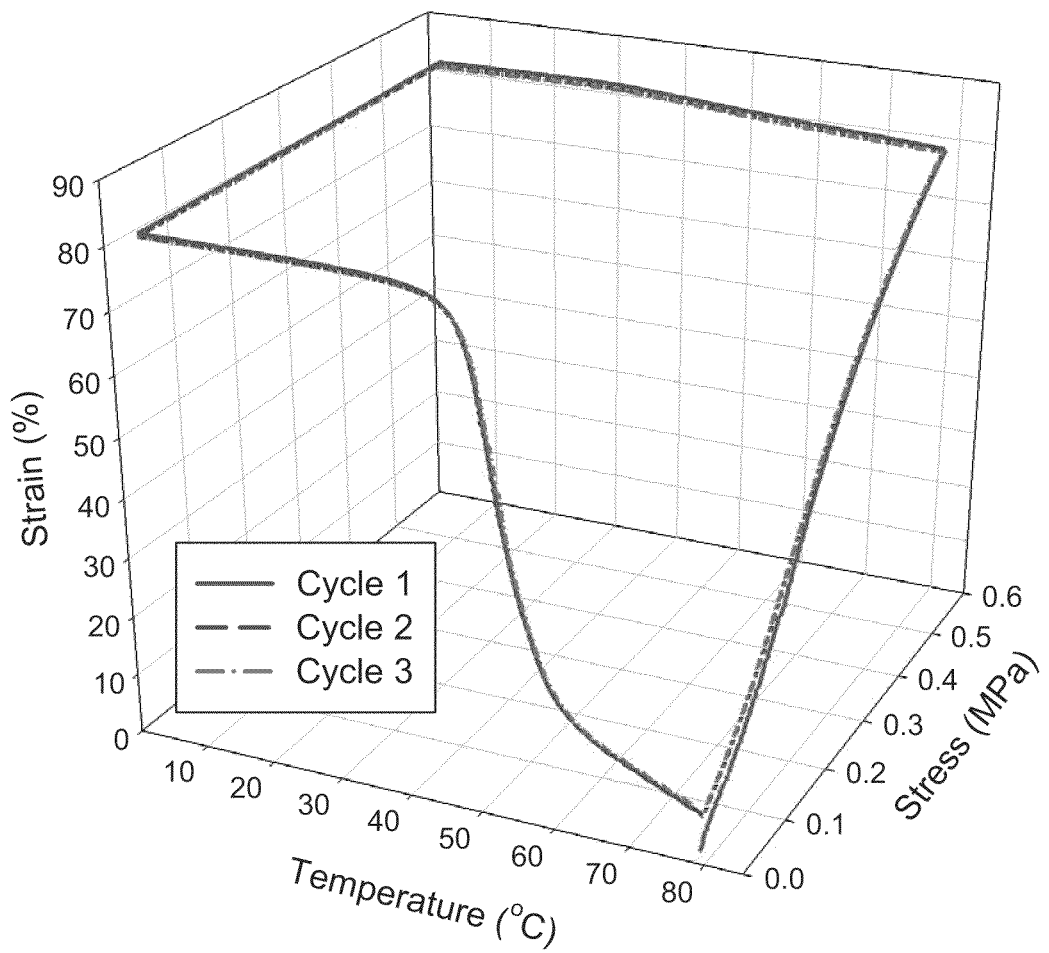

FIG. 18 is a graph of the stress-temperature-strain plot showing the one-way shape memory (1WSM) cycles of the Sylgard/PVAc composite where three consecutive cycles were performed.

DETAILED DESCRIPTION OF THE INVENTION

Figure 1:
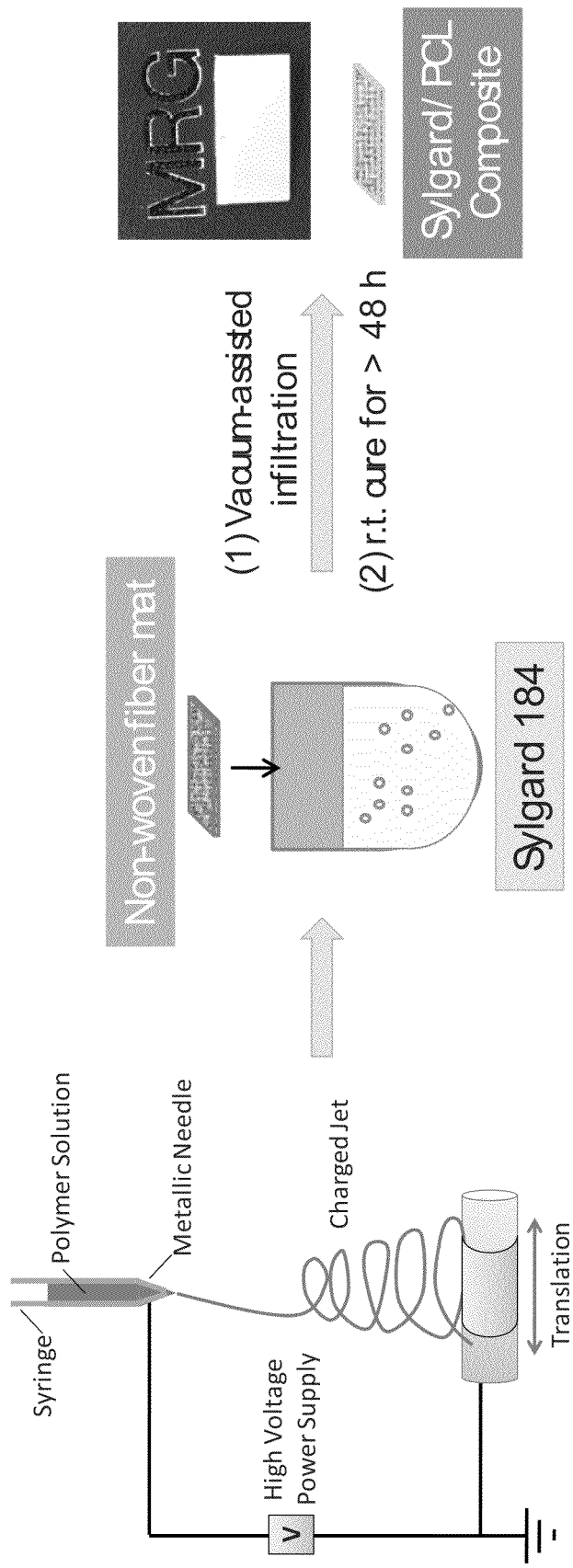
FIG. 1 is a schematic illustrating the two-step preparation of a shape memory composite according to the present invention.

Referring now to the drawings, wherein like reference numerals refer to like parts throughout, there is seen in FIG. 1 a two-step process for fabricating a shape memory elastomeric composite according to the present invention. The composite consists of an electrospun non-woven fiber mat and an elastomeric resin matrix. According to the present invention, the fiber mat is made from a semi-crystalline polymer, such as poly(ε-caprolactone) (PCL), or a glass-forming polymer, such as poly(vinyl acetate), which serve as the "switching phase" for shape fixing and recovery. The resin matrix, which may be a crosslinked PDMS elastomer, such as Sylgard 184, imparts softness as well as entropic elasticity to the material. Other elastomeric matrices may be used, including polyanhydride based biodegradable elastomers such as those reported in Shipp et al., Elastomeric and degradable polyanhydride network polymers by step-growth thiol-ene photopolymerization, Chem. Commun., Royal Society of Chemistry, 2009, 6415-6417, hereby incorporated by reference in its entirety.

Example I

PCL, a semi-crystalline polymer with a low $T_m$ of c.a. 60° C. was purchased from Sigma-Aldrich and used as received. It has a vendor-specified $M_w$ of 65,000 g/mol. The "actual" molecular weight was determined by gel permeation chromatography (GPC; Waters Isocratic HPLC system) using three-angle (45°, 90° and 135°) light scattering (Wyatt miniDAWN) to be $M_w$=76,830 g/mol and $M_n$=65,190 g/mol (a dn/dc value of 0.075 mL/g was used). PVAc is a glassy polymer with a DSC measured $T_g$ of c.a. 38° C., and was purchased from Scientific Polymer Products, Inc. and used as received. The vendor specified $M_w$ is 260,000 g/mol. For the elastomer matrix, a two-part, hydrosilation chemistry based silicone rubber with the commercial name Sylgard-184 (Dow Corning; hereafter "Sylgard") was used.

Referring to FIG. 1, a two-step process was developed for the fabrication of SMECs. The first step involves the preparation of non-woven thermoplastic fiber mats using electrospinning, which is a very versatile technique for producing polymeric micro- and nano-fibers. Electrospinning was conducted using a custom built setup consisting of a high voltage power supply (Agilent E3630A), a syringe pump (KDS100, KD Scientific) and a rotating drum collector. It should be recognized by those of skill in the art that the electrospinning process may be varied to produce different diameter and length fibers, as well as different packing densities, by varying various variables, including the starting solution concentration, the voltage used, the needle aperature, and the translation speed and distance.

PCL was electrospun from a 15 wt-% solution in a mixed chloroform/DMF solvent ($V_{chloroform}$: $V_{DMF}$=8:2), with a flow rate of 1 mL/h, a voltage of 15 kV, and a tip-to-collector distance of 10 cm. For PVAc, the solution was prepared by dissolving 2 g of PVAc in 10 mL ethanol. The flow rate, applied voltage, and tip-to-collector distance were 2 mL/h, 8 kV and 10 cm, respectively. The resulting non-woven fiber mat was then immersed in a two-part Sylgard mixture (mixing ratio=10:1). Vacuum (30 in-Hg) was applied for 20 min to ensure complete infiltration of Sylgard into the fiber mat. After carefully removing the extra Sylgard resin on the surface with a spatula, the infiltrated SMEC was cured at room temperature for >48 hr. The resulting composite comprised approximately twenty-five percent PCL by weight.

Scanning electron microscopy (SEM) was used to study the morphologies of electrospun fiber mats and the resulting SMECs. Samples were sputter coated with gold and examined by a JEOL JSM5600 SEM instrument. A typical accelerating voltage of 10 kV was used.

The thermal properties of different materials were studied using differential scanning calorimetry (DSC). Samples (typical mass ~3-5 mg) were encapsulated in Tzero™ aluminum pans and examined on a Q200 (TA Instruments) DSC instrument. A typical temperature program is as follows: first heating from 40° C. to 100° C., then cooling to −90° C., and finally heating to 100° C. All heating and cooling rates used were 10° C./min.

The thermomechanical behavior of cured SMECs as well as neat Sylgard were investigated using DMA (TA Instruments, Q800). For a typical experiment, a rectangular sample (with typical dimensions of 5 mm*2.5 mm*0.5 mm) is loaded under tension. A small oscillation with an amplitude of 15 μm (tensile strain<0.5%), a frequency of 1 Hz and a "force track" (the ratio of static to dynamic force) of 115%, were then applied while ramping the temperature from −150° C. to 120° C. at 3° C./min. The tensile storage modulus (E'), loss modulus (E") and tan δ were recorded by the instrument.

A well-established four-step thermomechanical cycling method was used to characterize the one-way shape memory behavior of SMECs. For Sylgard/PCL composites, the sample (a rectangular film with dimensions of 5.2 mm*3.1 mm*0.56 mm) was first stretched at 80° C. (T>PCL $T_m$) by gradually ramping the tensile stress to 0.2 MPa (step 1), followed by cooling to 5° C. at a rate of 2° C./min while holding the stress constant (step 2). The stress was then quickly released (a small load of 0.001 N was maintained to keep the sample under tension) to witness strain fixing (step 3). Unconstrained recovery was finally triggered by heating to 80° C. at 2° C./min (step 4).

To further quantify the one-way shape memory behavior, two characteristic ratios, fixing ratio ($R_f$) and recovery ratio ($R_r$) were calculated according to:

$$R_f(N) = \frac{\varepsilon_u(N)}{\varepsilon_m(N)} \times 100\% \quad (4\text{-}1)$$

$$R_r(N) = \frac{\varepsilon_u(N) - \varepsilon_p(N)}{\varepsilon_u(N) - \varepsilon_p(N-1)} \times 100\% \quad (4\text{-}2)$$

where $\varepsilon_m$, $\varepsilon_u$, $\varepsilon_p$ and N represent the strain before unloading, the strain after unloading, the permanent (residual) strain after heat-induced recovery, and the cycle number, respectively. In both cases a value of 100% indicates complete strain fixing/recovery. For cycle 1, $\varepsilon_p(0)$ was taken as the initial strain (primarily thermal strain) at the beginning of the experiment.

Tensile stress-strain tests were conducted at room temperature to study the large strain behavior of SMECs. For each experiment, a rectangular sample was loaded under tension and stretched at a strain rate of 5%/min until reaching a prescribed strain, then unloaded at the same strain rate until the force diminished to zero. The stress-strain curves for both loading and unloading were plotted.

The ultimate mechanical/fracture behavior of Sylgard/PCL SMECs was studied using trouser-tear tests, guided both by ASTM D624-00 as well as Keller, M. W.; White, S. R.;

Sottos, N. R. *Adv. Funct. Mater* 2007, 17, (14), 2399-2404, hereby incorporated by reference. The sample geometry and the loading condition are shown in FIG. 7. The pre-crack was created by pressing down a fresh razor blade. Experiments were conducted on a Linkam tensile testing system (Linkam ST-350) under a constant displacement rate of 10 mm/min. The tear strength, $T_s$, was calculated from:

$$T_S = \frac{F_{max}}{d}$$

where $F_{max}$ and d stand for the maximum force achieved during test and the sample thickness (varied between 0.5 to 0.6 mm), respectively.

Fully cured Sylgard/PCL composites are rubber-like solids with a white color. The average PCL weight fraction among the composites fabricated was measured gravimetrically to be 25.6% (or a volume fraction of 23.6%, calculated using the densities of PCL (1.145 g/cm$^3$) and Sylgard (1.03 g/cm$^3$)) with a small standard deviation of 0.5%, indicating good reproducibility of our fabrication process.

Figure 2:
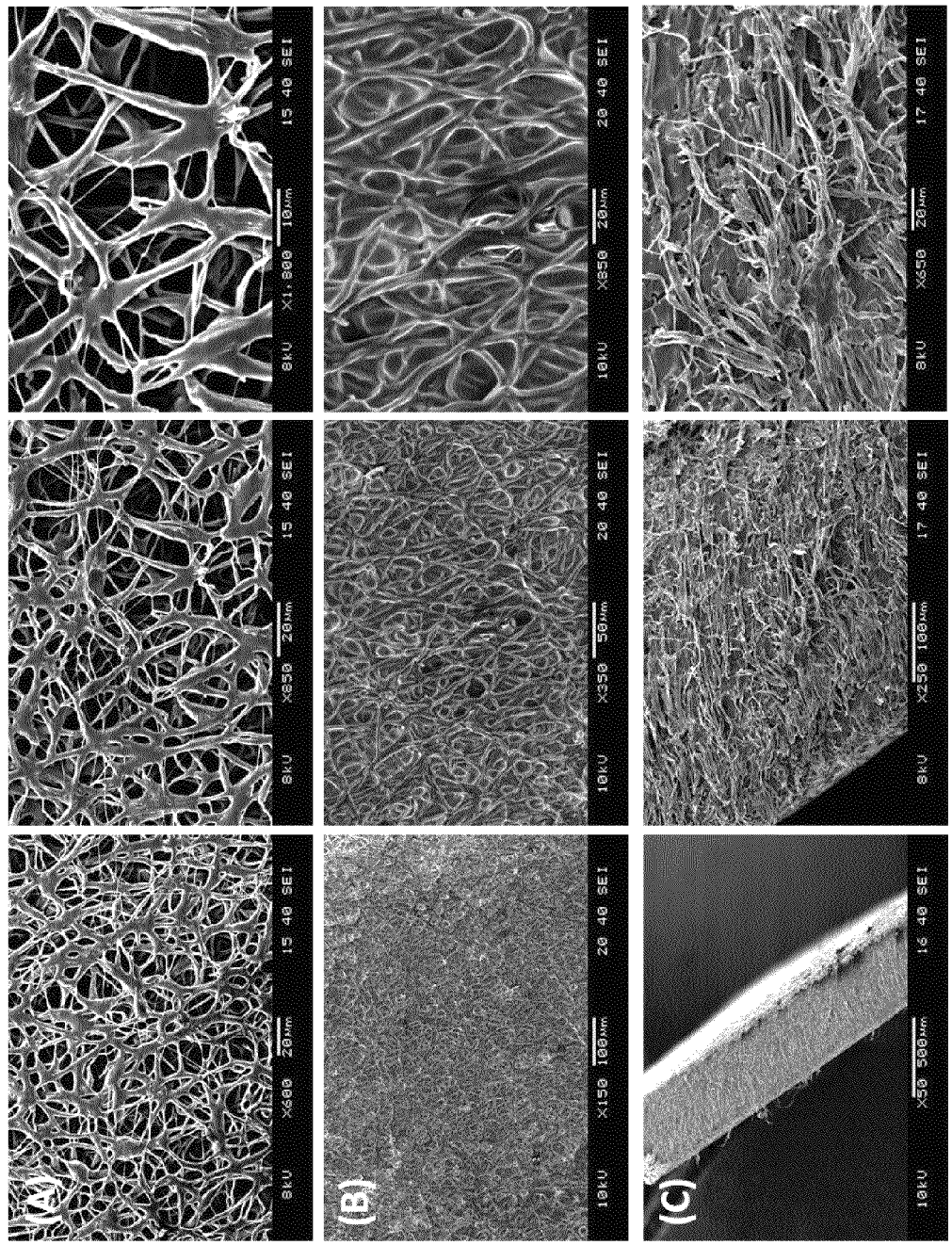
FIG. 2 is a series of SEM micrographs showing (a) as-spun PCL fiber mat, (b) top surface and (c-e) fractured surfaces of Sylgard/PCL composites.
Figure 4:
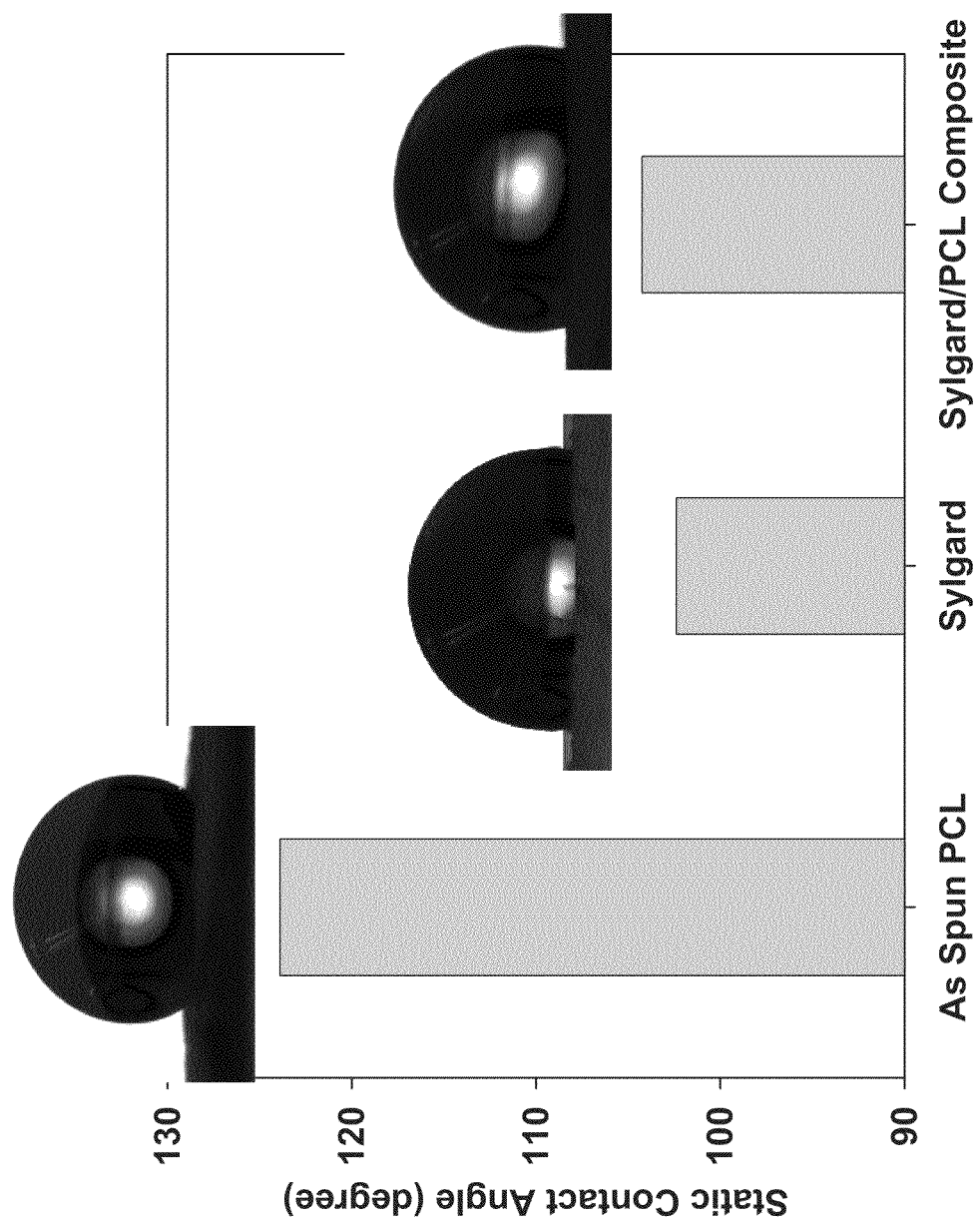
FIG. 4 is a graph of static water contact angles for as-spun PCL fiber mat, pure Sylgard, and Sylgard/PCL composite.

The morphology of as-spun PCL is shown in FIG. 2, which reveals a porous structure with highly interconnected fibers. The average fiber diameter was analyzed using image analysis to be 1.93±0.60 µm, as seen in FIG. 8. From SEM images of the top surface of a Sylgard/PCL composite, it can be clearly seen that the infiltration was complete with all the original voids occupied by Sylgard, and the fiber structures were preserved. Referring to FIG. 4, the static water contact angle of Sylgard/PCL composite was measured to be 104.3° (Rame-Hart 250-F1 Standard Goniometer), slightly higher than neat Sylgard (103.4°) and much lower than as-spun PCL (123.9°). This indicates that the Sylgard/PCL composite has a medium hydrophobic surface similar to neat Sylgard, consistent with SEM observations that the surface is mostly covered by Sylgard, as seen in FIG. 2(B). The fractured surface of Sylgard/PCL seen in FIG. 2(C) further confirms the biphasic, non-woven fiber/matrix bulk morphology.

Figure 3:
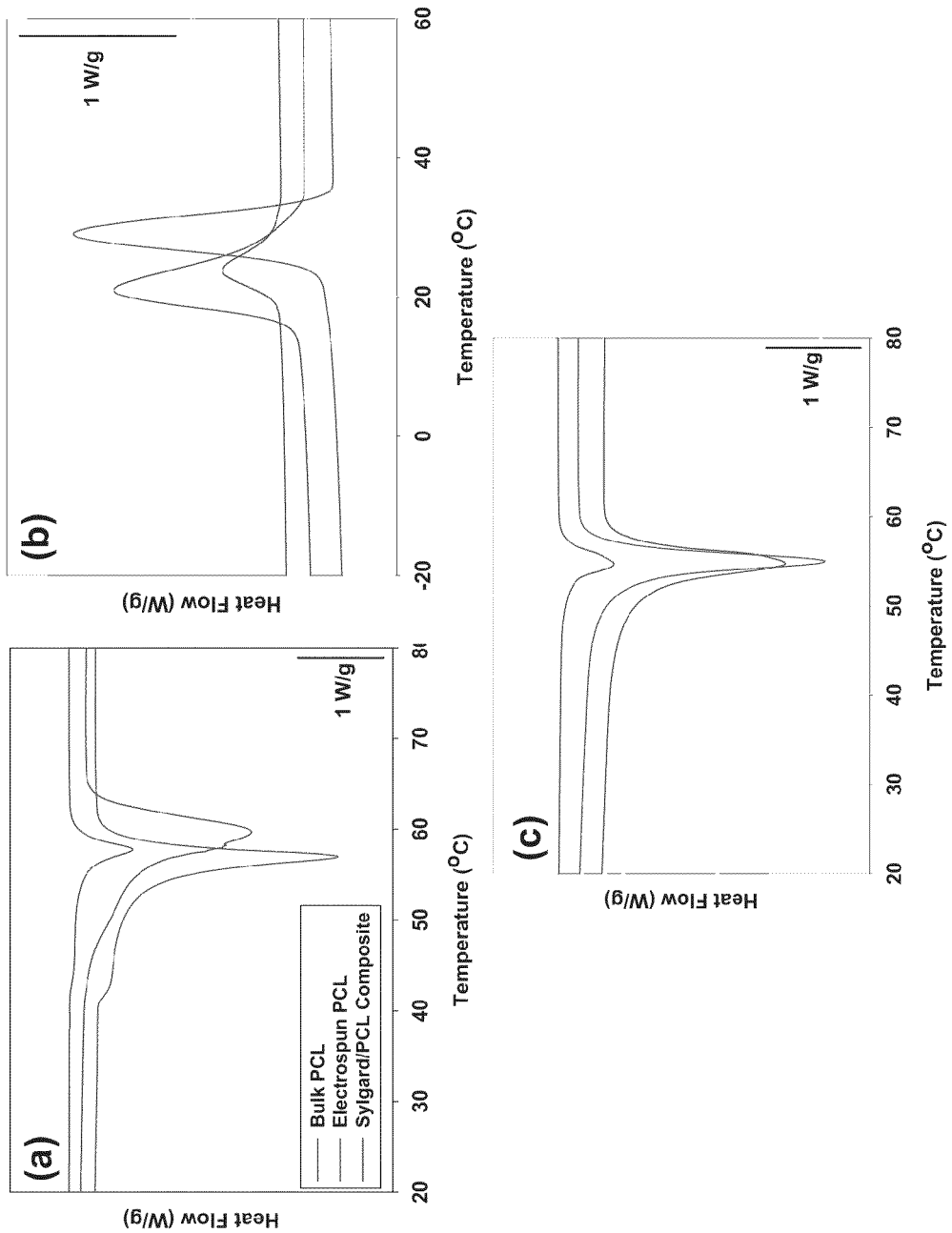
FIG. 3 is a series of DSC thermograms of bulk PCL, electrospun PCL and Sylgard/PCL composite showing: (a) 1st heating, (b) cooling and (c) 2nd heating at heating/cooling rates of 10° C. per minute.

FIG. 3 shows the 1$^{st}$ heating, cooling and 2$^{nd}$ heating DSC thermograms for bulk PCL, electrospun PCL and Sylgard/PCL composite. As expected, the PCL fibers in the Sylgard/PCL composite maintain the melting and crystallization behavior similar to the bulk. The melting temperatures from the second heating are indeed quite similar among the three materials tested.

Figure 5:
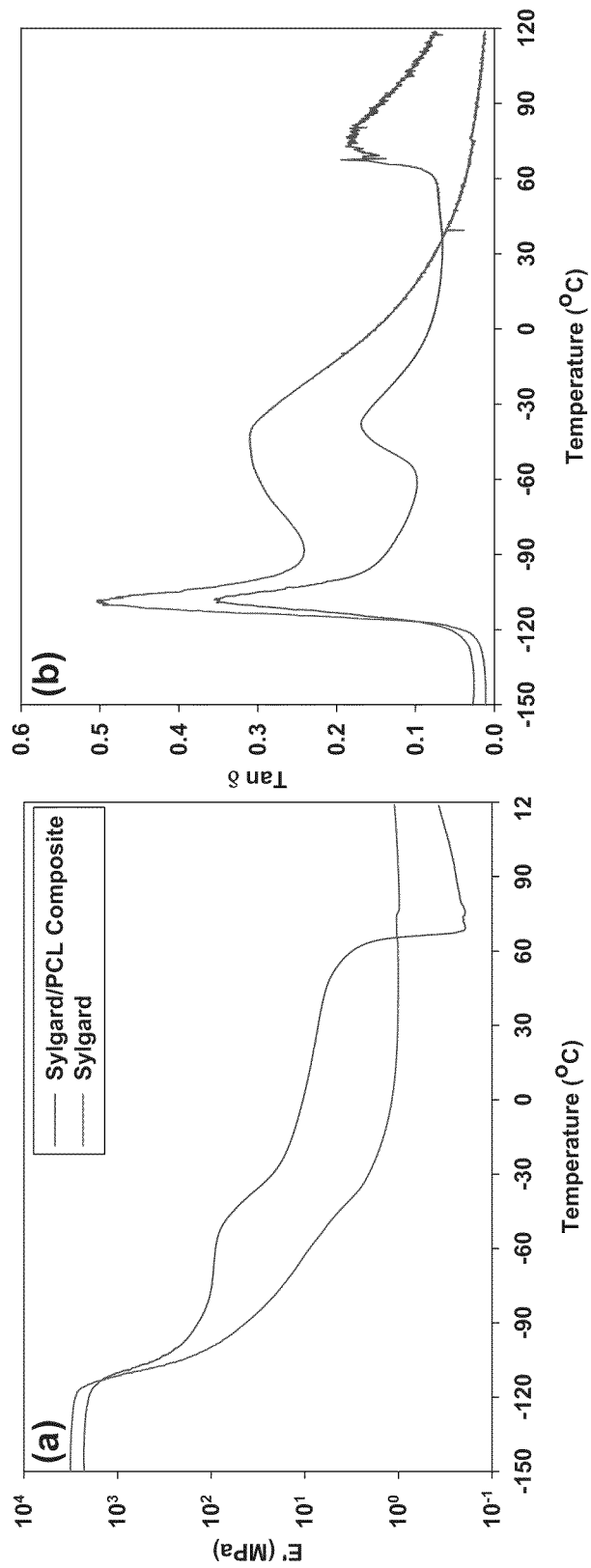
FIG. 5 is a graph of (a) Tensile storage modulus (E') and (b) tan δ of Sylgard/PCL composite and pure Sylgard.

Referring to FIG. 5, dynamic mechanical analysis (DMA) was further conducted to investigate the change of mechanical properties with temperature. It can be observed that the tensile storage modulus (E') and tensile loss tangent (tan δ) of the Sylgard/PCL composite displays three distinct transitions in the given temperature range, which can be attributed to the glass transition of Sylgard (−114.4° C.), the glass transition of PCL (−49.5° C.), and the melting of PCL (60.6° C.). All of the transition temperatures were determined from the onsets of storage modulus drop. In contrast, neat Sylgard has only two transitions: a glass transition at −115.2° C. and a minor transition at −46.9° C. associated with the melting of crystals formed during sub-ambient cooling. The Sylgard/PCL composite has a room temperature (25° C.) elastic modulus of 7.6 MPa and a low tan δ value of 0.067, indicating that the material is both soft and elastic. The storage modulus of the composite drops to 0.2 MPa above the melting temperature of PCL, lower than that of neat Sylgard (1.0 MPa) since PCL, at that point, is a viscous liquid with negligible contribution to overall load-bearing of what is effectively a silicone foam. The melting transition of PCL was then utilized to impart shape memory to the Sylgard/PCL system.

The one-way shape memory behavior of Sylgard/PCL composites was characterized using a 4-step thermomechanical cycling method. The result for three consecutive cycles is seen in FIG. 6(A), where each step is labeled, in comparison to neat Sylgard. The initial deformation at 80° C. (step 1) was quite elastic, given the linearity of the stress-strain curve. During cooling (step 2), the strain did not stay constant; rather it first increased by c.a. 5-6% until the temperature reached the $T_c$ of PCL (approximately 25° C.), then slightly decreased by c.a. 1% during further cooling to 5° C. This is in fact a quite ubiquitous phenomenon commonly observed in SMPs, but has seldom been studied in detail. A brief analysis is provided here. Upon cooling, the material tends to shrink due to thermal contraction. The thermal strain due to this effect is given by:

$$\epsilon_t = \alpha_L \Delta T$$

where $\alpha_L$, and $\Delta T$ are the linear thermal expansion coefficient and the change of temperature, respectively. Note that $\epsilon_t < 0$ since $\Delta T < 0$. At the same time upon cooling, the material is still in the rubbery state and follows the rubber elasticity theory:

$$E_R = 3\rho RT/M_C$$

where $E_R$, $\rho$, R, T and $M_C$ are the elastic tensile modulus, density, gas constant, temperature (in Kelvin) and the average molecular weight between crosslinks, respectively. The equation indicates that the material's modulus would decrease upon cooling. Since a constant stress was applied, this leads to a positive strain (elongation), $\epsilon_E$. Ignoring any large-strain effects (constant $E_R$ with strain), we obtain:

$$\varepsilon_E = \frac{\sigma}{E_R(T_2)} - \frac{\sigma}{E_R(T_1)}$$

here σ, $E_R(T)$ are the external stress and $E_R$ at temperature T, respectively. Considering the cooling from 80 to 25° C., using $\alpha_L = 9 \cdot 10^{-4}$, σ=0.2 MPa and $E_R$(80° C.)=0.2 MPa it may be estimated that $\epsilon_t$(80° C.→25° C.)≈−5.0% and $\epsilon_E$(80° C.→25° C.)≈17.6%. The net change in strain is ≈12.6%. This means that, between the two competing events, the reduction of rubbery modulus dominates and results in a net positive strain (elongation) upon cooling from 80 to 25° C. (PCL $T_c$). For the further cooling from 25° C. to 5° C., the same analysis can be applied, assuming that PCL crystallizes instantaneously at 25° C. and the rubber elasticity still holds (since the overall material is still rubbery). Using an $E_R$(25° C.) value of 7.6 MPa (taken from the E' at 25° C. when PCL is semi-crystalline), the $\epsilon_t$(25° C.→5° C.) and $\epsilon_E$(25° C.→5° C.) were calculated to be −1.8% and 0.2%, respectively. The net strain in this case is c.a. −1.6%, indicating the dominance of thermal contraction when T<$T_c$. The analysis, which shows good, qualitative agreement with the experimental observation, reveals that the change in strain upon cooling is dictated by the competition between thermal contraction and modulus reduction.

After cooling, the external stress was gradually released (see FIG. 6). As can be observed, a large strain (c.a. 95%) was retained (fixed). In contrast, neat Sylgard showed no capability to fix strain; i.e., the strain diminished to zero as the stress was released at 5° C. This behavior is expected for regular, low $T_g$ elastomers. The Sylgard/PCL composite showed a sharp recovery centered at approximately 60° C. (step 4), in good accordance with the melting temperature of PCL. A large percentage of fixed strain was recovered while a permanent (unrecovered) strain of about 30% remained at 80° C. The shape memory cycle was then repeated and showed no deterioration in performance over the three cycles conducted, in that the curves are almost identical. It is reasonable to conclude that the material has good cycle life-time for applications requiring repeated shape changes.

The fixing ($R_f$) and recovery ($R_r$) ratios were calculated from the equations above and plotted as a function of cycle number as seen in FIG. 9. The Sylgard/PCL composite shows almost complete shape fixing, evident from a high $R_f$ value (>97%) that was almost unchanged through cycle 1 to 3. This good fixing demonstrates the advantage of the present invention compared to direct blending. It has been shown in Zhang, H.; Wang, H.; Zhong, W.; Du, Q. Polymer 2009, 50, (6), 1596-1601, hereby incorporated by reference in its entirety, that fixing is poor when the elastomer (styrene-butadiene-styrene (SBS) triblock copolymer) forms the matrix, since the semi-crystalline polymer (PCL) can only exist as discrete spherical particles and cannot effectively bear the load as a whole to resist the entropically-driven recovery of the matrix. In the case of the present invention, the percolating fiber structure results in a much larger large interfacial area which facilitates load transfer and load distribution, together resulting in enhanced fixing.

Figure 10:
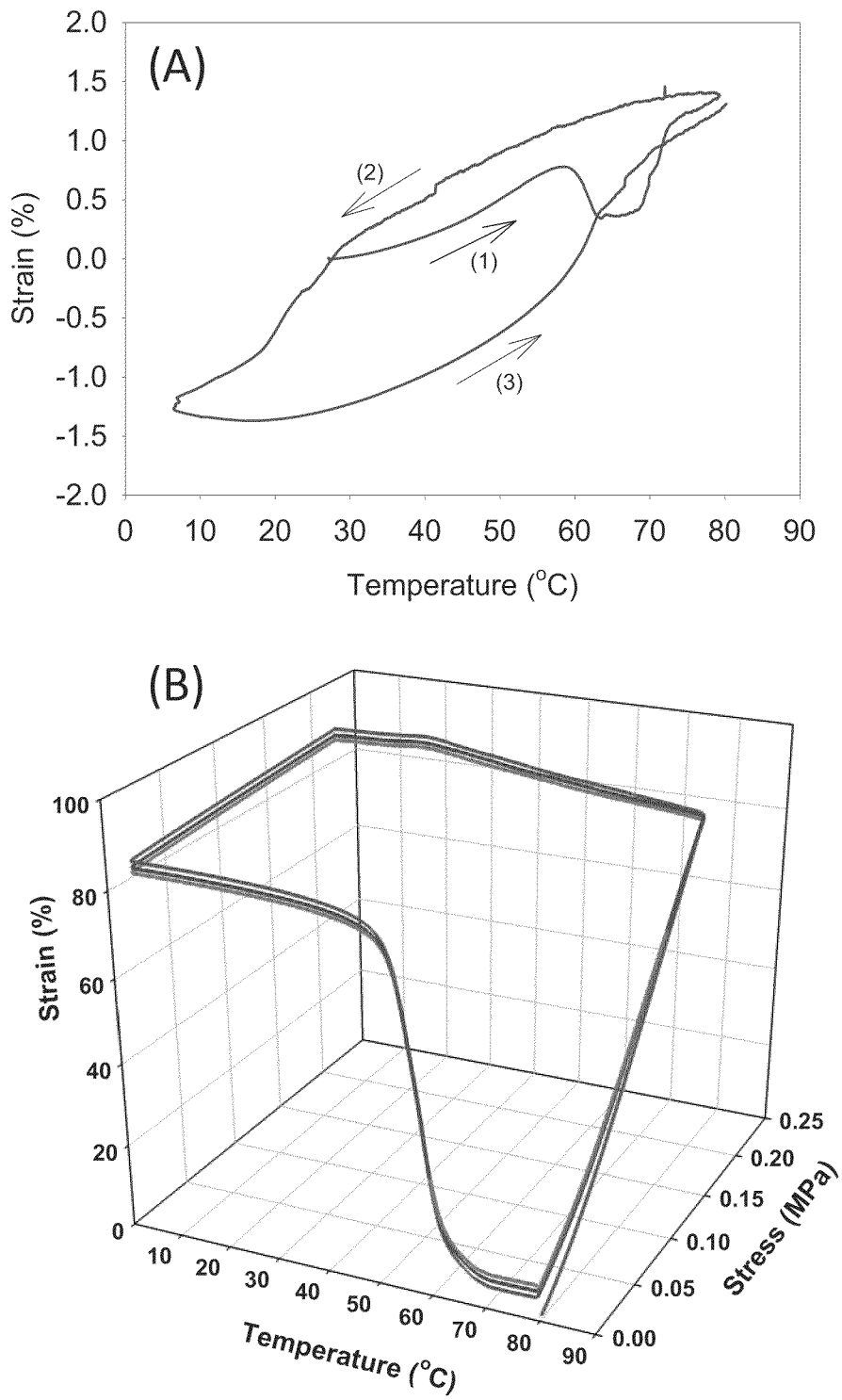

On the other hand, the recovery ratio $R_r$ showed a moderate value of 73.8% for the first cycle, due to the incomplete strain recovery upon heating. After cycle 1, it increased significantly to 97.0% in cycle 2, then slightly to 97.8% in cycle 3. This implies that, in practice, one can conduct a thermomechanical "conditioning" of the material (corresponding to cycle 1) to achieve high $R_r$ for future use, if complete shape recovery is desired for the given application. To explore this, a shape memory experiment was performed on a thermally conditioned Sylgard/PCL sample. The thermal conditioning was conducted by first heating the sample from 25° C. to 80° C., cooling to 5° C. and finally heating to 80° C. again. A small tensile force of 0.001 N was applied to keep the sample under tension. Referring to FIG. 10, the sample showed only some minor variations of strain during thermal conditioning. A shape memory experiment was conducted under the same conditions as described above immediately following the thermal conditioning step, with the result shown in FIG. 10(B). It is clear that the recovery of all three cycles was complete ($R_r$ close to 100%), and the large (~30%) residual strain at 80° C. was no longer observed. In other words excellent shape memory performance, with both $R_f$ and $R_r$ close to 100% can be achieved by applying a simple thermal conditioning.

Referring to FIG. 11, a series of photographs were taken as a visual presentation of the shape recovery process. The sample was preheated at 80° C., wound around a cold glass rod and allowed to cool at room temperature. The shape recovery was then triggered by placing the shape-fixed (coiled) sample on a hot plate at 80° C. The whole recovery process accomplished within several seconds, as shown.

Besides the small-strain dynamic mechanical behavior and shape memory performance, the large-strain mechanical properties of Sylgard/PCL composites were also characterized. For this purpose, tensile stress-strain tests were conducted at room temperature (25° C.), with the results seen in FIG. 12. Neat Sylgard displayed a very elastic behavior; i.e. the loading and unloading curves closely matched each other with very little hysteresis (between loading and unloading curves) and permanent strain. In contrast, Sylgard/PCL showed a considerably larger hysteresis that increased with higher strain. Also, some permanent strain is observed after unloading, due to the plastic deformation of PCL. However, the overall material behavior is still elastomeric, with a low tensile modulus and no distinct yield point.

The ultimate/fracture behavior of the Sylgard/PCL composite was also investigated. This is particularly important for silicone rubbers since they have intrinsically low tear strength. In practice, they are highly filled with reinforcements such as silica for mechanically demanding applications. Trouser-tear tests were performed for both neat Sylgard and Sylgard/PCL composite. Representative normalized-force (force divided by sample thickness) vs. displacement curves are shown in FIG. 13. Neat Sylgard was relatively weak, with a low tear strength value of 0.257±0.046 N/mm. In stark contrast, and quite unexpectedly, the Sylgard/PCL composite exhibited significantly higher normalized-forces. The tear strength was calculated to be 5.069±0.151 N/mm, an almost twenty-fold increase over neat Sylgard. The neat Sylgard showed a "clean" tear path with no macroscopic deformation. For the Sylgard/PCL composite, some permanent macroscopic deformation was clearly visible, which was expected based on the tensile stress-strain results. More importantly, a whitening zone was present along the tear path, which reflects localized plastic deformation of PCL fibers during the tear test. This was further confirmed by the SEM images of the fractured tear surface. Compared to the "normal" fractured surface that was created by pressing down a sharp razor blade seen in FIG. 2(C), the fractured surface after tear test seen in FIG. 14 showed much more significant plastic deformation of PCL fibers. This localized PCL deformation along the tear path is interpreted to be the major mechanism for enhanced tear strength.

The results from tensile stress-strain test and trouser tear demonstrate good mechanical properties of the Sylgard/PCL composite of the present invention. In fact, the percolating fiber/matrix morphology of the present invention may be a better strategy (compared to discrete reinforcement fillers that are commonly used) for the toughening of elastomers, as suggested by the tear test result.

Example II

The Sylgard/PCL system described above demonstrates the successful utilization of the approach of the present invention for developing mechanically robust shape memory elastomers. Another important advantage of the present invention is its versatility and broad applicability. Unlike most other SMPs, the design of SMECs is not limited to any material chemistry, nor does it depend on any specific interactions. The components can be selected from a broad range of polymers to control the overall material properties. For instance, one can use thermoplastic fibers (either glassy or semi-crystalline) with different $T_g$'s or $T_m$'s to adjust the transition temperature, or vary the crosslinking density of the matrix (without affecting the fibers) to achieve different levels of recovery stress. Accordingly, the present invention was also tested in connection with the use of a glassy polymer for the fibers. The resulting SMEC shows $T_g$ based (rather than $T_m$ based in the case of Sylgard/PCL) one-way shape memory.

The glassy polymer selected was poly(vinyl acetate). The morphology of the as-spun PVAc fiber mat is seen in FIG. 15. Uniform fibers were formed with narrowly distributed fiber diameters. The Sylgard/PVAc composite was prepared and cured in a similar fashion as the Sylgard/PCL system. As anticipated, fiber/matrix bulk morphology was observed as shown by the SEM images of the fractured surface of the Sylgard/PVAc composite. The average weight fraction of PVAc in the composites was measured to be 27.7±0.2%, comparable to the Sylgard/PCL system (25.6±0.5%).

Referring to FIG. 16, DSC was utilized to investigate the thermal properties of neat PVAc, as-spun PVAc and Sylgard/PVAc with $2^{nd}$ heating thermograms shown for comparison. For all the samples, the only detectable change is the step transition centered at ca. 40° C., attributed to the glass transition of PVAc. The $T_g$ slightly increased from 38.2° C. for neat PVAc, to 39.9° C. for as-spun PVAc and finally to 43.3° C. for the Sylgard/PVAc composite, which is possibly due to lower water absorption in the composite case.

The temperature-dependent dynamic mechanical response of the Sylgard/PVAc composite is seen FIG. 17. The two major transitions are attributed to the glass transition of Sylgard (low temperature) and the glass transition of PVAc, respectively. The PVAc $T_g$ determined from the onset of E' drop is 39.6° C., similar to the DSC result. Compared to Sylgard/PCL, the Sylgard/PVAc composite exhibits a much higher E' of 138.4 MPa at room temperature (25° C.), due to the glassy nature of PVAc fibers which are much more rigid than semi-crystalline PCL fibers. This indicates that semi-crystalline polymers are preferred choices to glassy polymers if the softness of the material at room temperature is desired, and vice versa.

One-way shape memory of the Sylgard/PVAc composite was assessed using a similar thermomechanical method to that described in Example 1. There is seen in FIG. 18 the results for three consecutive cycles. Excellent shape memory performance similar to the Sylgard/PCL system is observed. $R_f$ and $R_r$ are both close to 100% and almost unchanged through the cycles.

The present invention therefore provides a novel soft shape memory polymer based on an electrospun non-woven fiber composite, and a simple two-step method of fabrication. The excellent shape memory performance as well as low raw-materials and manufacturing cost makes this material ideal for a variety of applications where softness and shape memory are both desired. Furthermore, this approach enables the tuning of the individual components (since one can easily modify/change the fiber mat or/and the matrix) therefore the overall thermal, mechanical and shape memory properties of the composite can be controlled in a facile fashion. This approach can become potentially a general "route" for designing and fabricating SMPs from various materials, including thermoset/thermoplastic elastomers, semi-crystalline and glassy polymers, and quite immediate commercialization potential is evident.

For example, the present invention may be used to form adaptive seals, such as heat-shrinkable seals that prevent water leaking. The present invention may also be used to produce configurable surgical tools, such as guide wires, and re-configurable materials for microfluidic devices (e.g., lab-on-a-chip application). The present invention may also provide for sustained release of substances (perfume, drug, etc.), materials for reversible embossing; vascular grafts and external medical devices, and thermally reversible adhesives.

What is claimed is:

1. A shape memory elastomer, comprising
   a non-woven mat comprising fibers of poly(vinyl acetate) that directly interconnect to and are continuous with a plurality of adjacent said fibers to define a plurality of pores;
   a resin matrix comprising poly(dimethyl siloxane) infiltrated throughout the pores of said mat;
   wherein the resin infiltrated mat includes about twenty-seven percent by weight of said poly(vinyl acetate) based on said resin and is characterized by one-way shape memory.

2. The elastomer of claim 1, wherein said non-woven mat comprises fibers having an average diameter of about 1.93 micrometers.

3. A shape memory elastomer, comprising
   a non-woven mat comprising fibers of poly(ε-caprolactone) that interconnect to and are continuous with a plurality of adjacent said fibers to define a plurality of pores; and
   a resin matrix comprising poly(dimethyl siloxane) infiltrated throughout the pores of said mat;
   wherein said resin infiltrated mat includes about twenty-five percent by weight of said poly(ε-caprolactone) based on said resin and is characterized by one way shape memory.

4. The elastomer of claim 3, wherein said non-woven mat comprises fibers having an average diameter of about 1.93 micrometers.

5. A method of making a shape memory elastomer, comprising the steps of:
   electrospinning a thermoplastic elastomer to form a non-woven mat;
   immersing said non-woven mat in a resin matrix including a base resin and a cross-linking agent;
   infiltrating said resin matrix into said non-woven mat in the presence of a vacuum; and
   curing said non-woven mat;
   wherein said non-woven mat comprises a thermoplastic polymer selected from the group consisting of poly(ε-caprolactone) and poly(vinyl acetate);
   wherein said resin matrix comprises poly(dimethyl siloxane).

6. The method of claim 5, wherein said non-woven mat comprises fibers having an average diameter of about 1.93 micrometers.

7. The method of claim 5, wherein said non-woven mat comprises a polymer selected from the group consisting of glassy polymers and semi-crystalline polymers.

8. The method of claim 5, wherein said non-woven mat comprises electrospun poly(vinyl acetate) and said resin matrix comprises cross-linked poly(dimethyl siloxane).

* * * * *